United States Patent [19]

Ogawa

[11] Patent Number: 4,461,795
[45] Date of Patent: Jul. 24, 1984

[54] MARKS FOR USE IN RUBBER ARTICLES

[75] Inventor: Masaki Ogawa, Kodaira, Japan

[73] Assignee: Bridgestone Tire Company Limited, Tokyo, Japan

[21] Appl. No.: 470,735

[22] Filed: Feb. 28, 1983

[30] Foreign Application Priority Data

| Mar. 1, 1982 [JP] | Japan | 57-27130[U] |
| May 15, 1982 [JP] | Japan | 57-70079[U] |
| May 21, 1982 [JP] | Japan | 57-74511[U] |
| Dec. 22, 1982 [JP] | Japan | 57-194698[U] |
| Feb. 7, 1983 [JP] | Japan | 58-15368[U] |

[51] Int. Cl.$^3$ ............................................. B60C 13/00
[52] U.S. Cl. .................................. 428/64; 152/353 R; 156/116; 428/80; 428/187; 428/217; 428/220; 428/339; 428/349; 428/354; 428/423.5; 428/423.9; 428/424.6; 428/424.7; 428/424.8; 428/475.2; 428/475.8; 428/476.1; 428/480; 428/483
[58] Field of Search .................. 428/80, 137, 200, 204, 428/207, 187, 217, 220, 339, 64, 349, 354, 423.5, 423.7, 423.9, 424.6, 424.7, 424.8, 475.2, 475.8, 476.1, 480, 483; 156/116; 152/353 R

[56] References Cited

U.S. PATENT DOCUMENTS

| 3,692,610 | 9/1972 | Kornstein | 428/187 |
| 4,086,388 | 4/1978 | Brown | 428/315 |
| 4,256,159 | 3/1981 | Williams | 156/116 |
| 4,287,984 | 9/1981 | Okamoto et al. | 428/517 |
| 4,401,145 | 8/1983 | Hauseh | 428/187 |
| 4,424,253 | 1/1984 | Anderson | 428/517 |

Primary Examiner—James C. Cannon
Attorney, Agent, or Firm—Sughrue, Mion, Zinn, Macpeak and Seas

[57] ABSTRACT

A mark for use in rubber article is disclosed, which comprises a chromatic rubber composition layer containing not less than 30 parts by weight of at least one of chloroprene rubber and chlorosulfonated polyethylene rubber and having a thickness of 0.1 to 1.5 mm, an antioxidant-migration film barrier selected from polyester film, nylon film, vinylidene chloride film and vinylidene chloride-vinyl chloride copolymer film and having a thickness of 3 to 100 $\mu$m, and an adhesive layer of thermoplastic polyester or polyurethane having a thickness of 0.005 to 0.5 mm.

16 Claims, 8 Drawing Figures

FIG_7
PRIOR ART

FIG_8
PRIOR ART

MARKS FOR USE IN RUBBER ARTICLES

This invention relates to chromatic marks for use in rubber articles provided with an antioxidant-migration film barrier having an excellent flex resistance which hardly cause color failure and have excellent flex resistance and weather resistance.

Heretofore, there have been made various studies on a technic for adhering a chromatic mark to rubber articles after vulcanization, particularly tires. For instance, there is practically no problem on the adhesion between the vulcanized rubber and the mark when using the technic as disclosed in Japanese Patent Application Publication No. 36,910/77. In this case, however, the stain resistance of the mark is considerably poor, so that the antioxidant migrates from the vulcanized rubber of the rubber article into the mark in a short period to cause color failure of the mark. Moreover, such a color failure can be prevented by using a stainproof antioxidant, but the antioxidative performance of this stainproof antioxidant is considerably inferior to that of an amine-series antioxidant having a strongest staining property, so that the stainproof antioxidant cannot generally be used only for preventing the color failure of the chromatic mark.

Now, there have been made many studies in order to prevent the color failure of the chromatic mark when using an amine-series antioxidant or the like having a strong staining property to rubber articles. Among them, a method as disclosed in Japanese Patent laid open No. 56-138,006 is excellent in the effect of preventing the color failure, but it has some drawbacks that small scratches are innumerably formed on the surface of the mark due to the presence of a metal foil disposed on the mark, and that when a tire provided with such a mark is run at a state of insufficient internal pressure for a long time, the metal foil is broken by fatigue to form a breaking nucleus, from which crack grows up to an outer rubber layer of the tire.

It is, therefore, an object of the invention to provide a chromatic mark for use in rubber articles which eliminates the aforementioned drawbacks, prevents the color failure, and considerably improves the beautiful appearance, flex resistance and weather resistance.

According to the invention, there is provided a mark for use in rubber articles comprising a chromatic rubber composition layer containing not less than 30 parts by weight of at least one of chloroprene rubber and chlorosulfonated polyethylene rubber per 100 parts by weight of total rubber content and having a thickness of 0.1 to 1.5 mm, an antioxidant-migration film barrier selected from polyester film, nylon film, vinylidene chloride film and vinylidene chloride-vinyl chloride copolymer film and having a thickness of 3 to 100 μm, and an adhesive layer selected from thermoplastic polyesters and thermoplastic polyurethanes and having a thickness of 0.005 to 0.5 mm.

In the preferred embodiment of the invention, the mark has a three-layer structure obtained by laminating the chromatic rubber composition layer, the antioxidant-migration film barrier and the adhesive layer in this order, or a four-layer structure obtained by laminating the chromatic rubber composition layer, the adhesive layer, the antioxidant-migration film barrier and the adhesive layer in this order, or a six-layer structure obtained by laminating the chromatic rubber composition layer, the adhesive layer, the antioxidant-migration film barrier, a shock-absorbing rubber composition layer containing not less than 30 parts by weight of at least one of chloroprene rubber and chlorosulfonated polyethylene rubber per 100 parts by weight of total rubber content and having a thickness of 0.1 to 1.5 mm, and the adhesive layer in this order.

In another preferred embodiment of the invention, the mark for use in rubber articles is composed of a four-layer laminate obtained by laminating a chromatic rubber composition layer containing not less than 50 parts by weight of chlorosulfonated polyethylene rubber with a chlorine content of not less than 30% by weight per 100 parts by weight of total rubber content and having a thickness of 0.1 to 1.0 mm, a nylon copolymer film barrier having a thickness of 0.008 to 0.3 mm and a softening point of 100° to 180° C., a shock-absorbing rubber composition layer containing not less than 50 parts by weight of chlorosulfonated polyethylene rubber with a chlorine content of not less than 30% by weight per 100 parts by weight of total rubber content and having a thickness of 0.1 to 1.5 mm, and an adhesive layer of thermoplastic polyester or thermoplastic polyurethane having a thickness of 0.005 to 0.2 mm and a softening point of 80° to 200° C. in this order, and has a total thickness of 0.25 to 3.0 mm.

According to the invention, it is favorable in practice that the outer surface of the mark is protected by providing a protective coating on the surface of the chromatic rubber composition layer. Further, it is preferable to form an indicative print on the surface of the chromatic rubber composition layer from viewpoints of expressiveness, beautiful appearance and labor-saving.

Moreover, the term "chromatic" color used herein means to be a color having either a lightness or a saturation or both. If the chromatic color has the lightness as in white, gray or the like, it has not necessarily the saturation. And also, if the chromatic color is black and has a brightness or the like and is different from black color of the tire in the color tone, it may be used as a mark.

The invention will be described in greater detail below.

In the chromatic rubber composition layer and the shock-absorbing rubber composition layer according to the invention, chloroprene rubber and chlorosulfonated polyethylene rubber are used as a rubber component because they have a considerably excellent weather resistance. Among them, the use of chlorosulfonated polyethylene rubber is more preferable because it is excellent in the adhesion to polyester film, nylon copolymer film, thermoplastic polyester and thermoplastic polyurethane.

The chloroprene rubber is preferable to have a grade that the crystallization is slow and the change of hardness at low temperature is small. The chlorosulfonated polyethylene rubber is preferable to have a chlorine content of 25 to 43% by weight, preferably 30 to 43% by weight. When the chlorine content is less than 25% by weight, the adhesion to adjoining layers lowers.

In the rubber compositions, at least one of chloroprene rubber and chlorosulfonated polyethylene rubber is compounded in an amount of not less than 30 parts by weight, preferably not less than 50 parts by weight per 100 parts by weight of total rubber content, to which may be added at least one diene rubber selected from acrylonitrile-butadiene copolymer rubber, synthetic polyisoprene rubber, natural rubber, polybutadiene rubber, butadiene-styrene copolymer rubber, butyl rubber, halogenated butyl rubber and the like in such an amount that the effect of chloroprene rubber or chlorosulfonated polyethylene rubber is not damaged.

The chromatic rubber composition layer and the shock-absorbing rubber composition layer are favorable to have a hardness (measured at 30° C. by a spring hardness test (A-type) according to JIS K-6301) of not more than 70° in order to improve the flex resistance.

These rubber compositions may contain a filler for chromatic color such as silicic anhydride, calcium carbonate, magnesium carbonate, talc, iron oxide, bentonite, zinc white, diatomaceous earth, china clay, clay alumina, titanium oxide and the like, or may contain additives usually used in rubber industry such as vulcanizing agent, vulcanization accelerator, antioxidant, softener, wax and the like. Furthermore, they may contain carbon black, if necessary.

In the chlorosulfonated polyethylene rubber composition, a combination of magnesium oxide (magnesia) usually used as a pigment, thiuram-series vulcanization accelerator and sulfur or a combination of magnesium oxide (magnesia), pentaerythritol, thiuram-series vulcanization accelerator and sulfur is preferably used as a vulcanizing system. In this case, litharge may be used as a metal oxide.

As the thiuram-series vulcanization accelerator, use may be made of accelerator DPTT (dipentamethylenethiuram tetrasulfide), accelerator TMTD (tetramethylthiuram disulfide) and the like.

The shock-absorbing rubber composition layer serves to surface the chromatic rubber composition layer for the improvement of beautiful appearance and to mitigate strain if the rubber article is repeatedly subjected to such a strain. Therefore, the shock-absorbing rubber composition layer may have the same composition as in the chromatic rubber composition layer if the hardness of the former layer is low, but is most preferable to be made dark, particularly black from viewpoint of the surfacing of the chromatic rubber composition layer.

The antioxidant-migration film barrier to be used in the invention acts to advantageously intercept the migration of the staining amine-series antioxidant from the rubber article and is selected from polyester film, nylon film, vinylidene chloride film and vinylidene chloride-vinyl chloride copolymer film.

As the polyester film are used films produced by using a polyester or a blend of two or more polyester as mentioned below. As the polyester, mention may be made of polybisphenol A terephthalate, polyethylene terephthalate, polybutylene terephthalate, poly-(1,4,7-trioxa-3,3,5,5-tetrafluoroheptamethylenecarbonyl-1,3-phenylenehexafluorotrimethylene-1,3-phenylenecarbonyl), poly-(1,4,7-trioxa-3,3,5,5-tetrafluoroheptamethyleneisophthaloyl), poly-(1,4,7-trioxa-3,3,5,5-tetrafluoroheptamethylene-5-pentyloxyisophthaloyl), poly-(oxyadipoyloxy-2,6-dichloro-1,4-phenyleneisopropylidene-3,5-dichloro-1,4-phenylene), poly-(oxyadipoyloxy-3,3',5,5'-tetramethyl-4,4-biphenylene), poly-(oxyadipoyloxydecamethylene), poly-(oxyadipoyloxy-2,6-dimethyl-1,4-phenyleneisopropylidene-3,5-dimethyl-1,4-phenylene), poly-(oxyadipoyloxy-1,4-phenyleneisopropylidene-1,4-phenylene), poly-(oxyadipoyloxy-2,6-diphenyl-1,4-phenylenemethylene-3,5-diphenyl-1,4-phenylene), poly-(oxy-5-butyl-1,3-phenyleneoxyisophthaloyl), poly-(oxydibutyltinoxyadipoyl), poly-(oxydibutyltinoxyfumaroyl), poly-(oxydibutyltinoxyterephthaloyl), poly-(oxycarbonyl-3,3'-biphenylene-carbonyloxy-1,4-phenyleneisopropylidene-1,4-phenylene), poly-(oxycarbonyl-1,4-cyclohexylenecarbonyloxy-1,4-phenyleneisopropylidene-1,4-phenylene), poly-(oxycarbonyl-2,6-naphthylenecarbonyloxydecamethylene), poly-(oxyethyleneoxycarbonyl-1,4-cyclohexylenecarbonyl), poly-(oxyethyleneoxycarbonyl-2,2'-dimethyl-4,4'-biphenylenecarbonyl), poly-(oxyethyleneoxycarbonyl-1,1,3-trimethylindan-3,5-irene-1,4-phenylenecarbonyl), poly-(oxyethyleneoxycarbonyl-1,4-naphthylenecarbonyl), poly-(oxyethyleneoxycarbonyl-1,5-naphthylenecarbonyl), poly-(oxyethyleneoxycarbonyl-2,6-naphthylenecarbonyl), poly-(oxyethyleneoxycarbonyl-2,7-naphthylenecarbonyl), poly-(oxyethyleneoxycarbonyl-1,4-phenylene-sec-butylidene-1,4-phenylenecarbonyl), poly-(oxyethyleneoxycarbonyl-1,4-naphthylenecarbonyl), poly-(oxyethyleneoxycarbonyl-1,5-naphthylenecarbonyl), poly-(oxyethyleneoxycarbonyl-2,6-naphthylenecarbonyl), poly-(oxyethyleneoxyisophthaloyl), poly-(oxy-5-ethyl-1,3-phenyleneoxyisophthaloyl), poly-(oxyisophthaloyloxy-2-methyl-1,4-phenyleneisopropylidene-3-methyl-1,4-phenylene), poly-(oxy-2,2,4,4-tetramethyl-1,3-cyclobutyleneoxycarbonyl-trans-1,4-cyclohexylenecarbonyl), poly-(oxy-5-methyl-1,3-phenyleneoxyisophthaloyl), poly-(oxyterephthaloyloxymethylene-1,4-cyclohexylenemethylene), poly-(oxyterephthaloyloxy-1,4-phenyleneisopropylidene-1,4-phenylene) and the like.

Among these polyester films, the use of polyethylene terephthalate is most preferable in view of the balance between the film strength and the effect of intercepting antioxidant migration.

As the nylon film, use may be made of nylon-6 film, nylon-6,6 film, nylon-11 film, nylon-12 film, nylon copolymer film and the like.

The nylon copolymer film is obtained by polymerizing two or more nylon homopolymers, and basically by co-condensation polymerization of caprolactam with at least one other nylon salt. As the other nylon salt are used nylon-6,6 salt, nylon-6,10 salt and the like. The nylon copolymer film is preferably used as the antioxidant-migration film barrier because it is high in the flexibility due to the drop of crystallizability and good in the adhesion to the chromatic rubber composition layer and the shock-absorbing rubber composition layer.

According to the invention, the thermoplastic polyurethane or thermoplastic polyester is laminated on either side of the antioxidant-migration film barrier to form an adhesive layer for rubber article or rubber composition layer, which serves not only for the bonding between the chromatic rubber composition layer and the antioxidant-migration film barrier and the bonding between the mark and the rubber article, but also to mitigate permanent strain applied to the antioxidant-migration film barrier. In the latter case, when the rubber article is subjected to repetitive strain, residual strain (or permanent strain) remains only in the antioxidant-migration film barrier of the mark bonded to the rubber article because this barrier has no rubbery elasticity and as a result, if compression strain is applied to both ends of the mark, small wrinkles are produced in the barrier, so that it is necessary to use the thermoplastic polyurethane or thermoplastic polyester having a flexible rubbery elasticity capable of sufficiently following to the occurrence of wrinkles.

Therefore, the thermoplastic polyurethane or polyester is preferable to have a hardness at 30° C. within a range of 60° to 96°. Furthermore, the thermoplastic polyurethane or polyester is preferable to have a softening point of 80° C. to 200° C. When the softening point is less than 80° C., it is apt to cause the peeling at boundary between the rubber article and the mark if the temperature of the rubber article rises to 70°–80° C. For instance, when the rubber article is a tire, it is possible that the temperature of the adhesive joint reaches to 60°–70° C. during the running of the tire exposed to light in summer season, so that there is a fear of producing the peeling of the mark from the tire. On the other hand, when the softening point exceeds 200° C., the hardness may become too high. Furthermore, the temperature of 200° C. is an upper limit for readily performing the sticking of the mark in general homes, above which the surface of the rubber article is deteriorated.

According to the invention, the thermoplastic polyester having the aforementioned softening point range is a single polyester or a blend of polyesters. In the thermoplastic polyester blend, the control of the softening point can be performed by properly selecting the blend ratio of polyesters, for example, the blend ratio of polyethylene terephthalate, polybutylene terephthalate and polyethylene isophthalate. Particularly, when using a polyester having a low softening point, the control of the softening point is performed by adding thereto a liquid polyester (trade name: Sansosizer P-1500A, made by Shinnippon Rika K.K.).

In the thermoplastic polyurethane, the softening point is usually controlled by changing the molecular weight of the polyurethane. Moreover, the control of the softening point may be performed by changing the branching degree of the molecular chain or by properly blending few kinds of polyurethanes.

Alternatively, the softening point and hardness of the thermoplastic polyester or polyurethane may be controlled by the addition of a plasticizer, a filler and the like.

In the mark according to the invention, an adhesive may be used between the adjoining layers such as chromatic rubber composition layer, antioxidant-migration film barrier, adhesive layer of thermoplastic polyurethane or polyester and the like. For instance, when a combination of phenol resin and nitrile rubber or a combination of phenol resin and neoprene is used as the adhesive between the polyester film and the thermoplastic polyester layer, the bonding power is considerably increased.

The invention will be described in detail with reference to the accompanying drawings, wherein.

Figure 1:
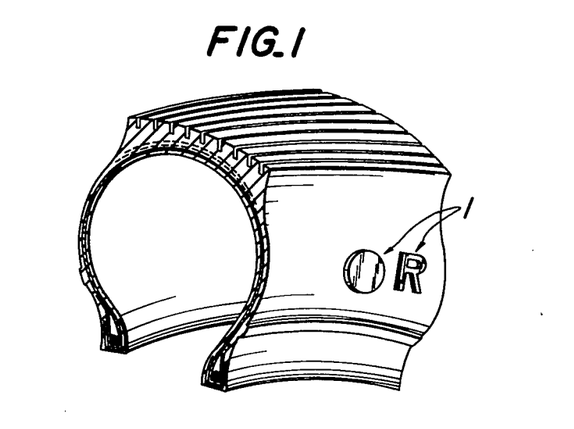
FIG. 1 is a partially perspective view of an embodiment of the tire provided with the mark according to the invention.
Figure 2:
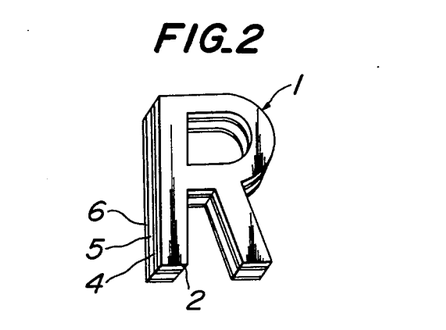
FIG. 2 is a perspective view of an embodiment of the mark according to the invention.

In FIG. 1 is shown an embodiment of applying a mark 1 as shown, for example, in FIG. 2 to a sidewall of a tire. Such a mark 1 has a laminate structure of 3 to 6 layers as shown in FIGS. 3 to 6. For instance, the mark 1 of FIG. 3 has a four-layer structure obtained by laminating a chromatic rubber composition layer 2, an adhesive layer 3 of thermoplastic polyurethane or thermoplastic polyester, an antioxidant-migration film barrier 4 and an adhesive layer 6 in this order viewed from the outer surface of the mark, while the mark 1 of FIG. 4 has a six-layer structure obtained by laminating a chromatic rubber composition layer 2, an adhesive layer 3, an antioxidant-migration film barrier 4, an adhesive layer 3', a shock-absorbing rubber composition layer 5 and an adhesive layer 6 in this order.

According to the invention, the mark 1 is bonded to the surface of the rubber article 7 by heating under pressure through the adhesive layer 6 of thermoplastic polyurethane or polyester. In this case, the bonding between the mark and the rubber article is performed at a temperature above 100° C. under pressure by a proper heating means such as heat press, radiation, laser, infrared ray or the like.

In the mark according to the invention, the reason why the thickness of each layer constituting the mark and the total thickness of these layers are limited to the ranges as previously mentioned is as follows.

The chromatic rubber composition layer 2 has a thickness of 0.1 to 1.0 mm. When the thickness is less than 0.1 mm, the handling is possible in laboratory but very difficult in industry. While, when the thickness exceeds 1.0 mm, not only the production cost becomes vainly higher, but also the total thickness of the mark becomes excessive, so that it is not favorable in view of industrialization and beautiful appearance.

As the antioxidant-migration film barrier 4 is used the film having a high modulus of elasticity as previously mentioned. Therefore, when using the film having a thickness of more than 100 $\mu$m, if the rubber article provided with the mark is subjected to repetitive strain, cracks occur in the boundary between the mark and the rubber article and grow therefrom. On the other hand, when the thickness is less than 3 $\mu$m, the film strength becomes too low and there is a high risk of producing the breaking of the film during the manufacture of the mark. For this reason, the thickness of the antioxidant-migration film barrier should be within a range of 3 to 100 $\mu$m. Preferably, the thickness of this barrier is 3 to 15 $\mu$m in view of the flex resistance of the mark.

The thickness of the adhesive layer 3, 3', 6 composed of thermoplastic polyester or polyurethane is 0.005 to 0.5 mm, preferably 0.005 to 0.2 mm, more particularly 0.01 to 0.03 mm. When the thickness is less than 0.005 mm, satisfactory bonding power cannot be obtained, while when the thickness exceeds 0.5 mm, extra amount of the thermoplastic polyester or polyurethane sticks out of the mark during the heat bonding, resulting in the damage of the beautiful appearance.

The shock-absorbing rubber composition layer 5 has a thickness of 0.1 to 1.5 mm. When the thickness is less than 0.1 mm, the two functions as mentioned above cannot be achieved, while when the thickness exceeds 1.5 mm, strain-mitigating effect is sufficiently satisfied, but the thickness itself becomes excessive, resulting in the damage of the beautiful appearance and the increase of the production cost.

The mark according to the invention has a total thickness of 0.25 to 3.0 mm. When the total thickness is less than 0.25 mm, the mark is deficient in the three-dimensional appearance, while when the total thickness exceeds 3.0 mm, not only the production cost becomes vainly higher, but also the mark is liable to suffer external damages in view of the beautiful appearance. For instance, when the mark is applied to the tire, the total thickness is most preferable to be about 0.4 to 1.2 mm.

Figure 5:
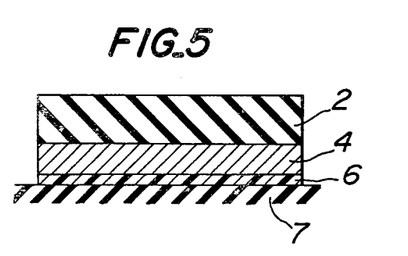
Figure 6:
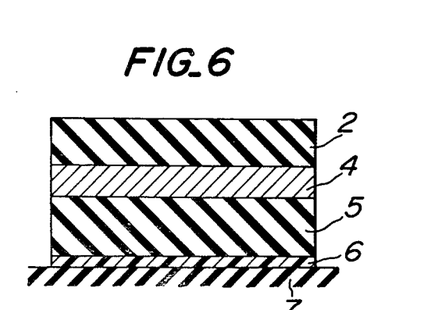

As the another embodiments of the invention, the mark of FIG. 5 has a three-layer structure obtained by laminating a chromatic rubber composition layer 2, an antioxidant-migration film barrier 4 and an adhesive layer 6 in this order viewed from the outer surface of the mark, while the mark of FIG. 6 has a four-layer structure obtained by laminating a chromatic rubber composition layer 2, an antioxidant-migration film barrier 4, a shock-absorbing rubber composition layer 5 and an adhesive layer 6 in this order.

In case of applying no adhesive layer to either side of the antioxidant-migration film barrier 4 as shown in FIG. 6, nylon copolymer film is preferably used as the barrier 4 because the nylon copolymer film is an antioxidant-migration barrier having high flexibility and crack propagation resistance. When using the nylon copolymer film, the thickness of the barrier should be within a range of 0.003 to 0.3 mm. When the thickness is less than 0.003 mm, the migration of the antioxidant cannot sufficiently be intercepted, while when the thickness exceeds 0.3 mm, the tensile force of the film itself becomes too large and the stress concentration is increased when the rubber article is subjected to repetitive strain and consequently there is caused the peeling between the nylon copolymer film barrier 4 and the shock-absorbing rubber composition layer 5. Moreover, the thickness of the nylon copolymer film is preferable within a range of 0.008 to 0.3 mm because when the thickness is less than 0.008 mm, the nylon copolymer film is apt to stick to rolls or the like and becomes bad in the workability.

The lamination of the chromatic rubber composition layer 2, nylon compolymer film barrier 4 and the shock-absorbing rubber composition layer 5 may easily be performed, for example, by press curing or the like, and also the lamination of the shock-absorbing rubber composition layer 5 to the adhesive layer 6 may easily be performed by roll press or the like. Moreover, the lamination of these layers can be carried out by many well-known methods in addition to the above lamination method.

As apparent from the above, the marks for use in rubber articles according to the invention have another significant merit that the industrial production thereof can be performed in the absence of a solvent. Because, when a solvent type adhesive is applied to the surface of each of the layers constituting the mark, it is very difficult to obtain a laminate having a uniform thickness due to the swelling of the layer with solvent.

The mark 1 according to the invention may be bonded to the rubber article 7 as follows: that is, a surface portion of the rubber article 7 to be bonded with the mark 1 is first treated with a surface-treating liquid such as a solution of N,N'-dichlorosulfonamide compound in acetone or the like and then the adhesive layer 6 of the mark 1 is contacted with the treated surface portion of the rubber article 7 and heat-pressed thereto by means of a hot iron. The temperature of the iron is usually within a range of 150° to 200° C., but it is not intended as limitation thereof.

According to the invention, the hardness is measured by a spring hardness test (A-type) according to JIS K-6301, and the softening point of nylon copolymer, thermoplastic polyurethane or thermoplastic polyester is measured by a Vicat softening temperature test according to JIS K-7206 under the following conditions:

| | |
|---|---|
| Measuring device | thermomechanical analyzer (TMA-TMS-1, UU-1), made by Perkin Elmer Corp. |
| Temperature rising rate | 0.62° C./min |
| Sample form | cubic body of 5 mm side |
| Indenter | column with a sectional area of 1.000 ± 0.015 mm$^2$ (contact surface of column top is flat) |
| Load | It is adjusted to apply a pressure of 20 g/mm$^2$ to the indenter top. |

In the latter case, the softening temperature is defined by a temperature when the indenter is entered into the sample by 1 mm.

The following examples are given in illustration of the invention and are not intended as limitations thereof.

In these examples, properties on the mark were evaluated by the following test methods.

(1) Drum test for crack propagation resistance

The tire provided with the mark and subjected to an internal pressure of 1.7 kg/cm$^2$ was run on a drum at a speed of 60 km/hr under JIS 130% load over a distance of 20,000 km. Thereafter, the presence of cracks was observed at the mark and the boundary between the mark and the tire.

(2) Stainproof test

The tire provided with the mark was left to stand in a ventilatable oven at 80° C. for one week and then exposed to a ultraviolet ray with a xenon lamp of 500 W output. Thereafter, the presence of color failure of the mark was observed.

(3) Durability test

The tire (tire size: 165 SR 13) provided with 10 marks per tire was mounted to a passenger car with a displacement of 1,500 cc, which was run over a distance of 41,330 km. Thereafter, the presence of mark peeling was observed. The property was evaluated by the number of tires exhibiting the partial or whole mark peeling.

(4) Drum test under low internal pressure

The tire provided with 10 marks per tire and subjected to an internal pressure of 1.2 kg/cm$^2$ was run on a drum at a speed of 60 km/hr under JIS 100% load over a distance of 20,000 km. Thereafter, the presence of cracking of mark and cracking at the boundary between the mark and the tire sidewall was observed.

Examples 1 to 10, Prior Art 1 to 2

At first, there were prepared five rubber compositions having a compounding recipe (unit: part by weight) as shown in the following Table 1. The white rubber compositions of Rubber Composition Nos. 1 and 2 were used in a chromatic rubber composition layer, while the carbon black-containing rubber compositions of Rubber Composition Nos. 3 to 5 were used in a shock-absorbing rubber composition layer.

The materials and trade names of the antioxidant-migration film layer and adhesive layer to be used were shown in the following Table 2.

Then, twelve marks as shown in the following Table 3 were manufactured by using the materials of Tables 1 and 2.

In Examples 1 to 4, the laminate sheet for the mark was obtained by bonding the adhesive layer having a predetermined thickness to the rubber composition sheet press-cured into a predetermined thickness at 155° C. for 30 minutes and the antioxidant-migration film barrier having a predetermined thickness with hot rolls.

In Examples 5 and 6, the laminate sheet for the mark was obtained by adhering the antioxidant-migration film barrier to the uncured white rubber composition, press-curing it into a predetermined thickness at 155° C. for 30 minutes, and bonding the adhesive layer thereto with hot rolls.

In Examples 7 to 10, the laminate sheet for the mark was obtained by adhering the antioxidant-migration film barrier and uncured shock-absorbing rubber composition to the uncured white rubber composition, press-curing it into a predetermined thickness at 155° C. for 30 minutes, and bonding the adhesive layer thereto with hot rolls.

In the prior art 1, the laminate sheet for the mark was obtained by bonding the thermoplastic polyurethane having a thickness of 20 μm to the white rubber composition sheet press-cured into a thickness of 0.7 mm at 155° C. for 30 minutes with hot rolls.

In the prior art 2, the laminate sheet for the mark was obtained by adhering aluminum foil to the uncured shock-absorbing rubber composition, press-curing it at 155° C. for 30 minutes and bonding the thermoplastic polyurethane having a thickness of 20 μm thereto with hot rolls.

Then, marks were manufactured by stamping out circle bodies of 30 mm diameter from each of these laminate sheets with a knife.

The thus obtained marks were heat-bonded to a sidewall of a radial tire for passenger car in an amount of 10 marks per tire by means of an iron heated at 160° C. In this case, the sidewall of the radial tire for passenger car (tire size: 165 SR 13) was previously treated with a surface-treating liquid consisting of a solution of N,N′-dichlorobenzene sulfonamide in acetone as disclosed in Japanese Patent Application Publication No. 36,910/77 prior to the heat bonding of the mark.

The drum test for crack propagation resistance, stain-proof test, durability test and drum test under low internal pressure as previously mentioned were made with respect to each of twelve tires provided with the mark to obtain results as shown in Table 3.

TABLE 1

| Application | Rubber composition No. | | | | |
|---|---|---|---|---|---|
| | 1 | 2 | 3 | 4 | 5 |
| | White rubber composition layer | | Shock-absorbing rubber composition layer | | |
| Chlorosulfonated polyethylene rubber (chlorine content 43 wt %)*1 | — | 95 | — | — | — |
| Chlorosulfonated polyethylene rubber (chlorine content 35 wt %)*2 | — | — | — | 95 | — |
| Chloroprene rubber*3 | 90 | 5 | 90 | 5 | — |
| Natural rubber | 10 | — | 10 | — | 30 |
| Acrylonitrile-butadiene copolymer rubber*4 | — | — | — | — | 70 |
| Carbon black HAF | — | — | 10 | 10 | 40 |
| CaCO$_3$*5 | 30 | 30 | 30 | 30 | — |
| TiO$_2$ | 20 | 20 | — | — | — |
| Dioctyl sebacate*6 | — | 35 | — | 35 | — |
| Naphthenic oil | 10 | — | 10 | — | 5 |
| Stearic acid | — | — | — | — | 2 |
| MgO | 1 | 4 | 1 | 4 | — |
| Pentaerythritol | — | 3 | — | 3 | — |
| Paraffin wax | 2 | 2 | 2 | 2 | 2 |
| ZnO | 5 | — | 5 | — | 3 |
| Vulcanization accelerator DPTT *7 | — | 2 | — | 2 | — |
| Vulcanization accelerator MBTS *8 | 0.2 | — | 0.2 | — | 0.5 |
| Vulcanization accelerator TMTD *9 | — | — | — | — | 0.2 |
| Vulcanization accelerator DEU *10 | 0.6 | — | 0.6 | — | — |
| Sulfur | 1.5 | — | 1.5 | — | 1.5 |

*1 trade name: Hypalon 48, made by Showa Neoprene K.K.
*2 trade name: Hypalon 40, made by E. I. Du Pont de Nemours & Co. Inc.
*3 trade name: Neoprene WRT, made by Showa Neoprene K.K.
*4 trade name: NBR 220S, made by Japan Synthetic Rubber Co., Ltd.
*5 Fatty acid-treated CaCO$_3$, trade name: Hakuenka CC, made by Shiraishi Kogyo K.K.
*6 trade name: DOS, made by K.K. Daihachi Kagaku Kogyosho
*7 Dipentamethylenethiuram tetrasulfide: trade name: Nocceler TRA, made by Ohuchi Shinko Kagaku K.K.
*8 Dibenomethylthiuramdisulfide: trade name: Nocceler DM, made by Ohuchi Shinko Kagaku K.K.
*9 Tetramethylthiuramdisulfide: trade name: Nocceler TT, made by Ohuchishinko Kagaku K.K.
*10 N,N′—Diethylthiourea: trade name: Nocceler EUR, made by Ohuchishinko Kagaku K.K.

TABLE 2

| | Material name | Trade name |
|---|---|---|
| Antioxidant-migration film barrier | Nylon-6 | Amilan CM1017, made by Toray K.K. |
| | Polyethylene terephthalate | Lumirror, made by Toray K.K. |
| | Nylon copolymer | Amilan CM4000, made by Toray K.K. |
| | Vinylidene chloride-vinyl chloride copolymer | Saranlap, made by Asahi Kasei K.K. |
| Adhesive layer | Thermoplastic polyester | Reformed product of Hitorel-S type, made by Toray K.K. (softening point 87° C., hardness 81°) |
| | Thermoplastic polyurethane | Paraprene DN4818, made by Japan Polyurethane K.K. (softening point 82° C., hardness 72°) |

TABLE 3

Figure 3:
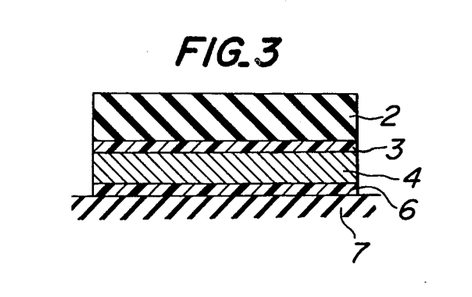
FIGS. 3 to 6 are sectional views of various embodiments of the mark according to the invention, respectively.
Figure 4:
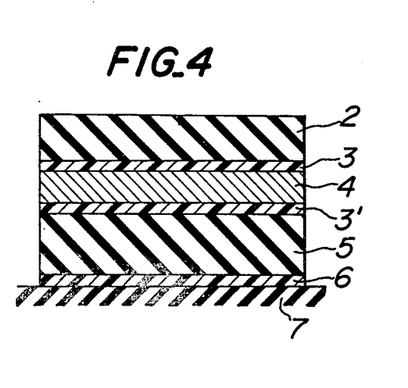
Figure 7:
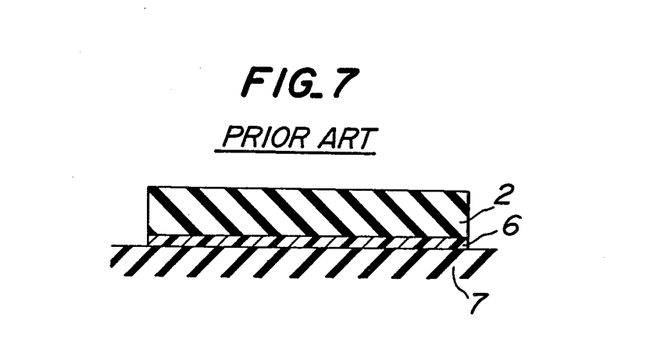
FIGS. 7 and 8 are sectional views of embodiments of the mark according to the prior art, respectively.
Figure 8:
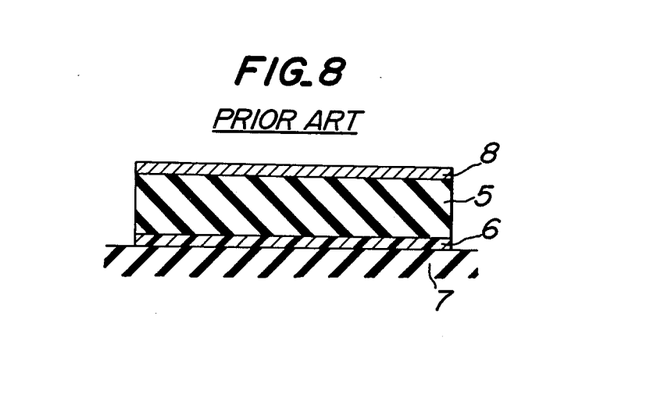

| | Mark No. | | | | | |
|---|---|---|---|---|---|---|
| | Prior Art 1 | Prior Art 2 | Example 1 | Example 2 | Example 3 | Example 4 |
| Structure of mark | FIG. 7 | FIG. 8 | FIG. 3 | | FIG. 4 | |
| Chromatic rubber composition layer | | | | | | |
| Rubber composition No. | 1 | — | 1 | 2 | 1 | 2 |
| Thickness (mm) | 0.7 | — | 0.3 | 0.3 | 0.3 | 0.3 |
| Antioxidant-migration | | | | | | |

TABLE 3-continued

| film barrier | | | | | | |
|---|---|---|---|---|---|---|
| Material | — | aluminum foil | PET | PET | nylon-6 | PET |
| Thickness (μm) | — | 50 | 50 | 4 | 10 | 4 |
| Adhesive layer | | | | | | |
| Material | thermoplastic polyurethane | thermoplastic polyurethane | thermoplastic polyurethane | thermoplastic polyester | thermoplastic polyester | thermoplastic polyester |
| Thickness (μm) | 20 | 20 | 20 | 20 | 20 | 20 |
| Shock absorbing rubber composition layer | | | | | | |
| Rubber composition No. | — | 5 | — | — | 3 | 4 |
| Thickness (mm) | — | 0.8 | — | — | 0.4 | 0.4 |
| Drum test for crack propagation resistance | none | presence | slightly presence (crack occurs in letter) | none | none | none |
| Stainproof test | presence (color failure of whole surface) | none | none | none | none | none |
| Durability test | none | 10 | 1 | none | none | none |
| Drum test under low internal pressure | none | 10 | 2 | none | none | none |

| | Mark No. | | | | | |
|---|---|---|---|---|---|---|
| | Example 5 | Example 6 | Example 7 | Example 8 | Example 9 | Example 10 |
| Structure of mark | FIG. 5 | | | FIG. 6 | | |
| Chromatic rubber composition layer | | | | | | |
| Rubber composition No. | 1 | 2 | 2 | 2 | 2 | 2 |
| Thickness (mm) | 0.3 | 0.3 | 0.3 | 0.3 | 0.3 | 0.3 |
| Antioxidant-migration film barrier | | | | | | |
| Material | PET | nylon copolymer | nylon copolymer | nylon copolymer | vinylidene chloride-vinyl chloride copolymer | vinylidene chloride-vinyl chloride copolymer |
| Thickness (μm) | 4 | 20 | 20 | 20 | 30 | 30 |
| Adhesive layer | | | | | | |
| Material | thermoplastic polyester | thermoplastic polyester | thermoplastic polyurethane | thermoplastic polyester | thermoplastic polyester | thermoplastic polyurethane |
| Thickness (μm) | 20 | 20 | 20 | 20 | 20 | 20 |
| Shock absorbing rubber composition layer | | | | | | |
| Rubber composition No. | — | — | 4 | 4 | 4 | 4 |
| Thickness (mm) | — | — | 0.4 | 0.4 | 0.4 | 0.4 |
| Drum test for crack propagation resistance | none | none | none | none | none | none |
| Stainproof test | none | none | none | none | none | none |
| Durability test | none | none | none | none | none | none |
| Drum test under low internal pressure | none | none | none | none | none | none |

In the marks, particularly chromatic mark according to the invention, the migration of antioxidant from rubber article is substantially completely prevented by using polyester film, nylon film, vinylidene chloride film or vinylidene chloride-vinyl chloride copolymer film which considerably advantageously prevents the migration of staining antioxidant, particularly amine-series antioxidant. Furthermore, this film has a sufficient performance of preventing the migration of antioxidant even when the thickness is fairly thin, so that the thickness and rigidity of the mark as a whole can be reduced. As a result, not only the beautiful appearance but also the flex resistance, resistance to external damage and resistance to peeling from rubber article are considerably improved, and also the weather resistance is excellent.

Furthermore, according to the invention, the chromatic rubber composition layer (2), antioxidant-migration film barrier (4), shock-absorbing rubber composition layer (5) and adhesive layer (3, 3', 6), each of which having excellent functional properties, are properly combined into a laminate structure of 3 to 6 layers, whereby the flex resistance and weather resistance, which have never been improved in the prior art, are considerably advantageously improved in addition to the improvement of beautiful appearance and the prevention of color failure, and also the bonding treatment can simply be performed.

The marks according to the invention are preferable as decoration for tires, particularly radial tires for passenger cars, but may be widely applied to rubber articles requiring a flex resistance, such as large hoses, conveyor belts, belts for power transmission, oil fences and the like.

What is claimed is:

1. A mark for use in rubber article comprising a chromatic rubber composition layer containing not less than 30 parts by weight of at least one of chloroprene rubber and chlorosulfonated polyethylene rubber per 100 parts by weight of total rubber content and having a thickness of 0.1 to 1.5 mm, an antioxidant-migration film barrier selected from polyester film, nylon film, vinylidene chloride film and vinylidene chloride-vinyl chloride copolymer film and having a thickness of 3 to 100 μm, and an adhesive layer selected from thermoplastic polyesters and thermoplastic polyurethanes and having a thickness of 0.005 to 0.5 mm.

2. A mark for use in rubber article according to claim 1, wherein said mark has a three-layer structure obtained by laminating said chromatic rubber composition layer, said antioxidant-migration film barrier and said adhesive layer in this order.

3. A mark for use in rubber article according to claim 1, wherein said mark has a four-layer structure obtained by laminating said chromatic rubber composition layer, said adhesive layer, said antioxidant-migration film barrier and said adhesive layer in this order.

4. A mark for use in rubber article according to claim 1, wherein said mark further comprises a shock-absorbing rubber composition layer containing not less than 30 parts by weight of at least one of chloroprene rubber and chlorosulfonated polyethylene rubber per 100 parts by weight of total rubber content and having a thickness of 0.1 to 1.5 mm.

5. A mark for use in rubber article according to claim 4, wherein said mark has a six-layer structure obtained by laminating said chromatic rubber composition layer, said adhesive layer, said antioxidant-migration film barrier, said adhesive layer, said shock-absorbing rubber composition layer and said adhesive layer in this order.

6. A mark for use in rubber article according to claim 1, wherein said mark has a total thickness of 0.25 to 3.0 mm.

7. A mark for use in rubber article according to claim 1, wherein said chlorosulfonated polyethylene rubber has a chlorine content of 25 to 43% by weight.

8. A mark for use in rubber article according to claim 7, wherein said chlorine content is 30 to 43% by weight.

9. A mark for use in rubber article according to claim 1, wherein said thermoplastic polyester and thermoplastic polyurethane having a softening point of 80° to 200° C.

10. A mark for use in rubber article according to claim 1, wherein said thermoplastic polyester and thermoplastic polyurethane have a hardness of 60° to 96° as measured at 30° C. by a spring hardness test (A-type) according to JIS K-6301.

11. A mark for use in rubber article according to claim 1, wherein said chromatic rubber composition layer has a hardness of not more than 70° as measured at 30° C. by a spring hardness test (A-type) according to JIS K-6301.

12. A mark for use in rubber article according to claim 1, wherein said chromatic rubber composition layer contains not less than 50 parts by weight of at least one of chloroprene rubber and chlorosulfonated polyethylene rubber per 100 parts by weight of total rubber content.

13. A mark for use in rubber article according to claim 4, wherein said shock-absorbing rubber composition layer contains not less than 50 parts by weight of at least one of chloroprene rubber and chlorosulfonated polyethylene rubber per 100 parts by weight of total rubber content.

14. A mark for use in rubber article according to claim 1, wherein said chromatic rubber composition layer is provided at its surface with a protective coating.

15. A mark for use in rubber article according to claim 1, wherein said chromatic rubber composition layer is provided at its surface with an indicative print.

16. A mark for use in rubber article comprising a four-layer structure obtained by laminating a chromatic rubber composition layer containing not less than 50 parts by weight of chlorosulfonated polyethylene rubber with a chlorine content of not less than 30% by weight per 100 parts by weight of total rubber content and having a thickness of 0.1 to 1.0 mm, a nylon copolymer film barrier having a thickness of 0.008 to 0.3 mm and a softening point of 100° to 180° C., a shock-absorbing rubber composition layer containing not less than 50 parts by weight of chlorosulfonated polyethylene rubber with a chlorine content of not less than 30% by weight per 100 parts by weight of total rubber content and having a thickness of 0.1 to 1.5 mm and an adhesive layer of thermoplastic polyester or thermoplastic polyurethane having a thickness of 0.005 to 0.2 mm and a softening point of 80° to 200° C. in this order, and having a total thickness of 0.25 to 3.0 mm.

* * * * *